(12) United States Patent
Shen et al.

(10) Patent No.: US 9,553,743 B2
(45) Date of Patent: Jan. 24, 2017

(54) TWO-DIMENSIONAL (2D) DECISION FEEDBACK EQUALIZER (DFE) SLICER WITHIN COMMUNICATION SYSTEMS

(71) Applicant: BROADCOM CORPORATION, Irvine, CA (US)

(72) Inventors: Ba-Zhong Shen, Irvine, CA (US); Mehmet Vakif Tazebay, Irvine, CA (US); Chung Ming Tu, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/834,615

(22) Filed: Aug. 25, 2015

(65) Prior Publication Data
US 2016/0056981 A1 Feb. 25, 2016

Related U.S. Application Data

(60) Provisional application No. 62/041,178, filed on Aug. 25, 2014.

(51) Int. Cl.
*H04L 25/06* (2006.01)
*H04L 25/03* (2006.01)

(52) U.S. Cl.
CPC ....... *H04L 25/066* (2013.01); *H04L 25/03057* (2013.01); *H04L 25/03146* (2013.01)

(58) Field of Classification Search
CPC ................... H04L 25/03057; H04L 25/03267; H04L 25/066; H04L 25/03146
See application file for complete search history.

(56) References Cited

U.S. PATENT DOCUMENTS

| | | | | |
|---|---|---|---|---|
| 5,712,873 A | * | 1/1998 | Shiue | H04N 5/211 348/E5.084 |
| 6,418,164 B1 | * | 7/2002 | Endres | H04L 27/01 348/607 |
| 8,831,063 B2 | * | 9/2014 | Lakkis | H04L 25/03057 375/130 |

(Continued)

OTHER PUBLICATIONS

"Basics of Error Control Codes" slides 1-49, 2011.*

*Primary Examiner* — Sophia Vlahos
(74) *Attorney, Agent, or Firm* — Garlick & Markison; Shayne X. Short

(57) ABSTRACT

A communication device (alternatively, device) includes a processor configured to support communications with other communication device(s) and to generate and process signals for such communications. In some examples, the device includes a communication interface and a processor, among other possible circuitries, components, elements, etc. to support communications with other communication device(s) and to generate and process signals for such communications. For example, the device's processor receives one or more signals from a communication channel. The processor then processes the one or more signals to generate 2D DFE soft slicer outputs and to decode the one or more signals based on the 2D DFE soft slicer outputs to generate estimates of information encoded within the one or more signals. The processor may process the 2D DFE soft slicer outputs to generate 2D DFE hard decisions and then generates other estimates of the information encoded based on the 2D DFE hard decisions.

20 Claims, 6 Drawing Sheets

(56) References Cited

U.S. PATENT DOCUMENTS

| | | | |
|---|---|---|---|
| 2004/0008765 A1* | 1/2004 | Chung | H03G 3/3052 |
| | | | 375/233 |
| 2004/0013189 A1* | 1/2004 | Jayaraman | H04L 25/067 |
| | | | 375/233 |
| 2005/0207477 A1* | 9/2005 | Monsen | H04B 1/7105 |
| | | | 375/147 |
| 2006/0291591 A1* | 12/2006 | Ghosh | H04L 1/203 |
| | | | 375/340 |
| 2008/0118229 A1* | 5/2008 | Bliss | G11B 20/10222 |
| | | | 386/357 |
| 2011/0052216 A1* | 3/2011 | Jiang | H04B 10/25133 |
| | | | 398/208 |
| 2013/0176778 A1* | 7/2013 | Chen | G11C 16/06 |
| | | | 365/185.03 |
| 2015/0124912 A1* | 5/2015 | Eliaz | H04L 25/03305 |
| | | | 375/341 |

* cited by examiner

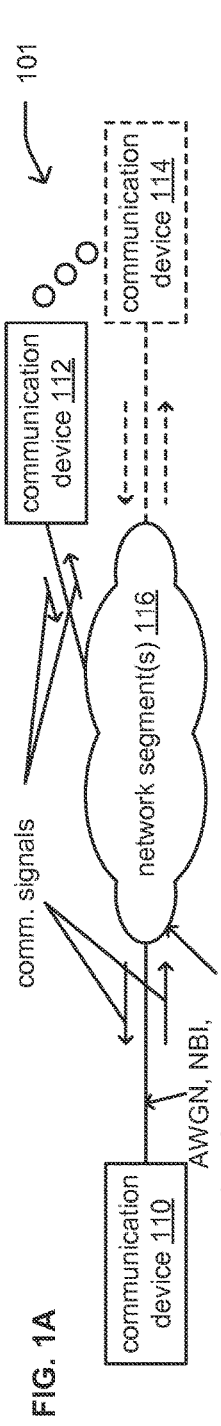
FIG. 1A
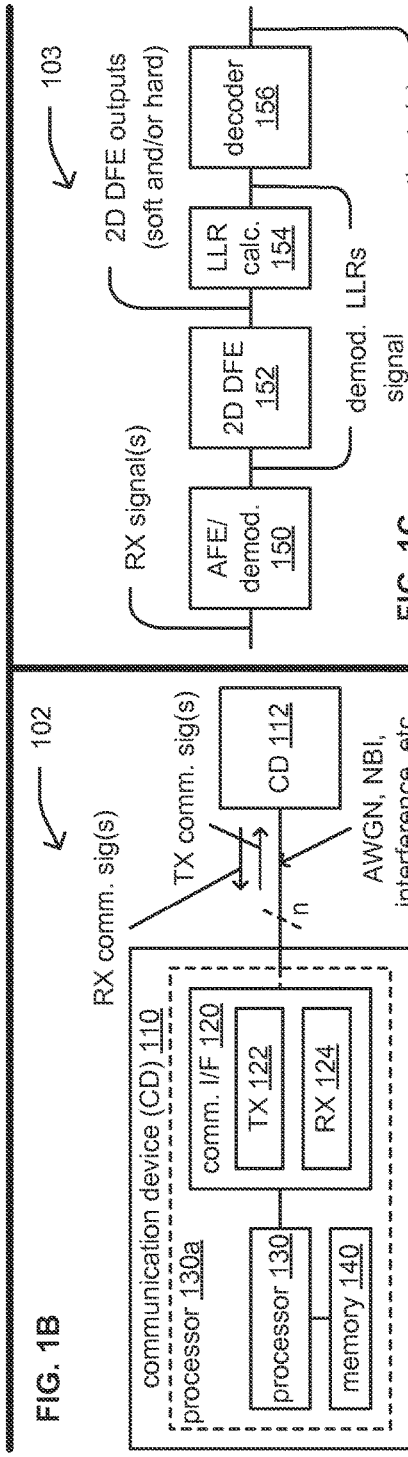
FIG. 1B
FIG. 1C
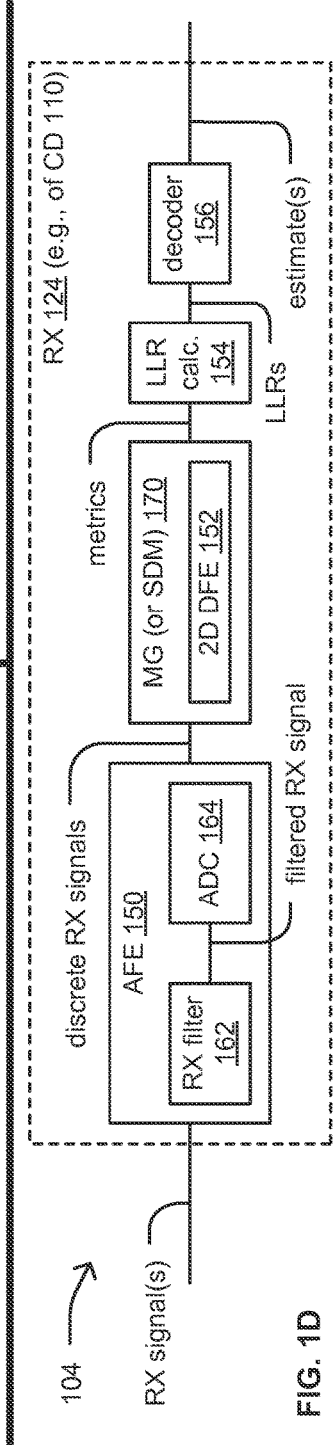
FIG. 1D

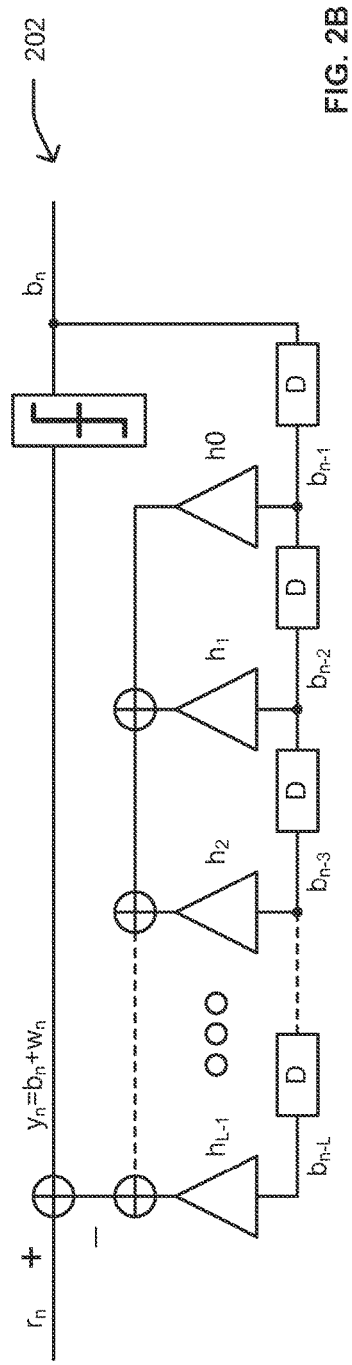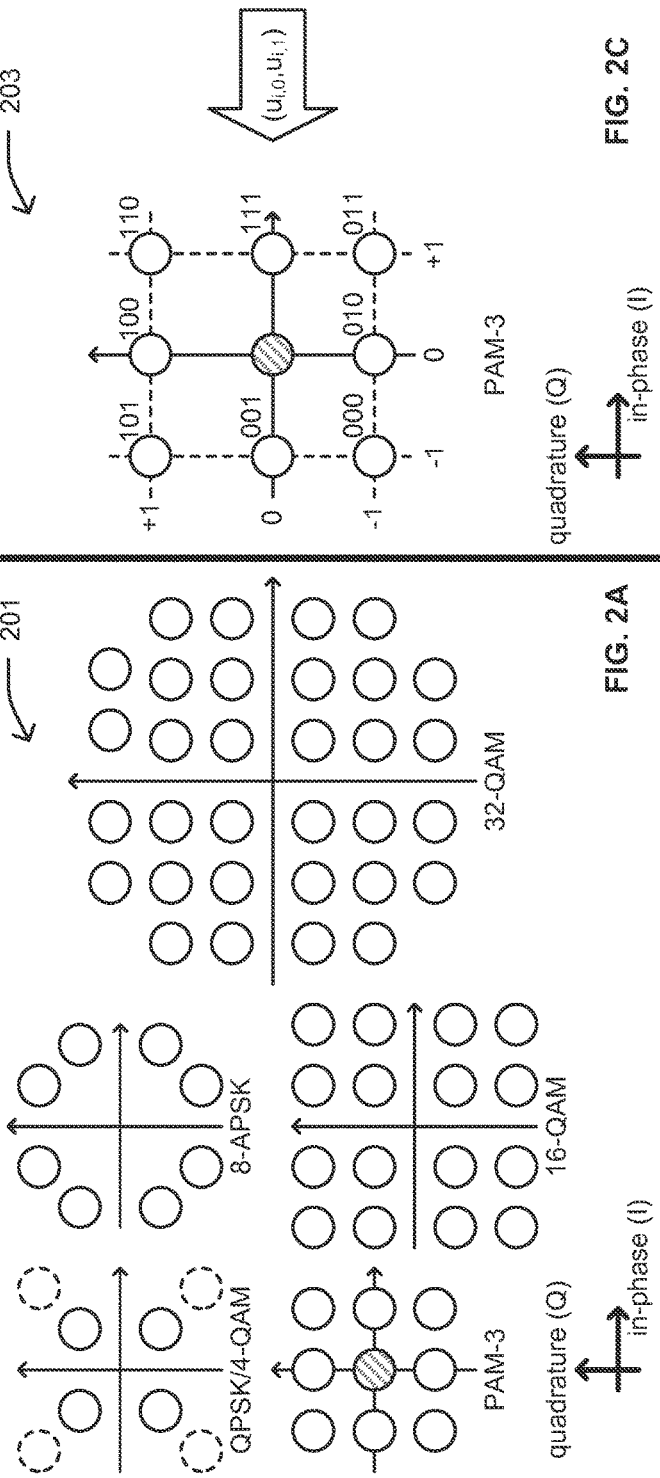

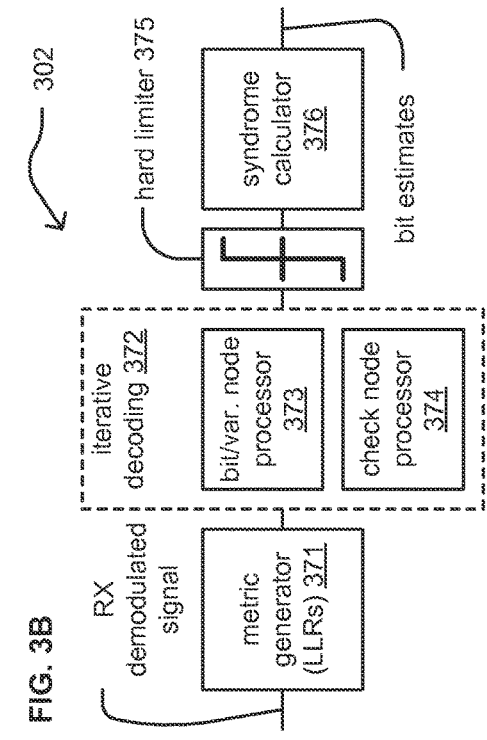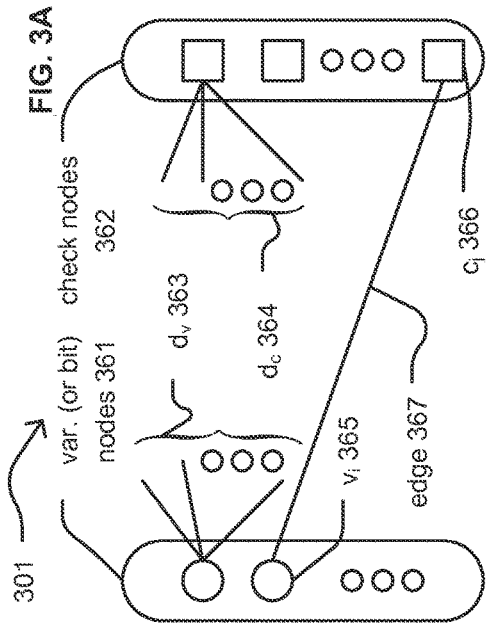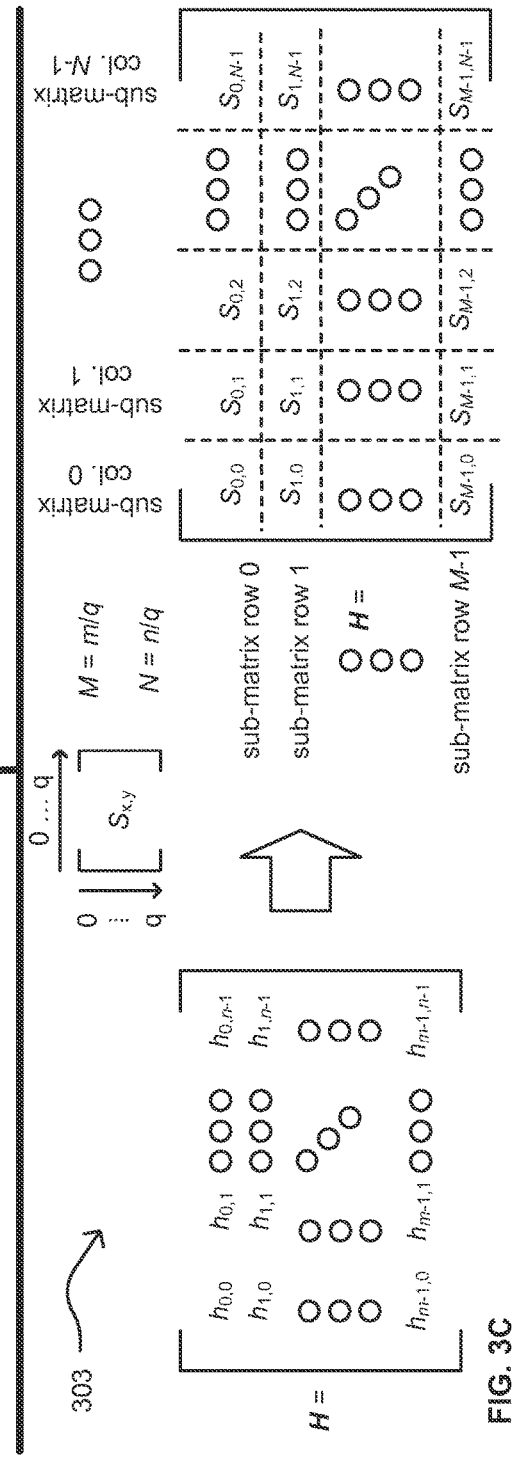

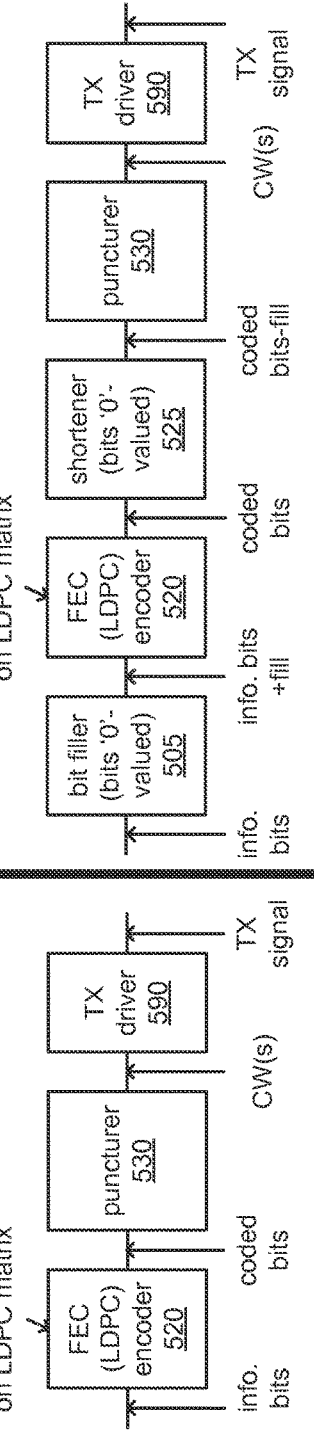

TWO-DIMENSIONAL (2D) DECISION FEEDBACK EQUALIZER (DFE) SLICER WITHIN COMMUNICATION SYSTEMS

CROSS REFERENCE TO RELATED PATENTS/PATENT APPLICATIONS PROVISIONAL PRIORITY CLAIM

The present U.S. Utility Patent App. claims priority pursuant to 35 U.S.C. §119(e) to U.S. Provisional App. No. 62/041,178, entitled "Low density parity check (LDPC) code for decision feedback equalizer (DFE) with 2-D slicer," filed Aug. 25, 2014, which is hereby incorporated herein by reference in its entirety and made part of the present U.S. Utility Patent App. for all purposes.

BACKGROUND

Technical Field

The present disclosure relates generally to communication systems; and, more particularly, to signal processing within such communication systems.

Description of Related Art

Data communication systems have been under continual development for many years. The primary goal within such communication systems is to transmit information successfully between devices. Unfortunately, many things can deleteriously affect signals transmitted within such systems resulting in degradation of or even complete failure of communication. Examples of adverse effects include interference and noise that may be caused by various sources including other communications, low-quality links, degraded or corrupted interfaces and connectors, etc.

Some communication systems use forward error correction (FEC) coding and/or error checking and correction (ECC) coding to increase the reliability and the amount of information that may be transmitted between devices. When a signal incurs one or more errors during transmission, a receiver device can employ the FEC or ECC coding to try to correct those one or more errors.

A continual and primary directive in this area of development has been to try continually to lower the signal to noise ratio (SNR) required to achieve a given bit error ratio (BER) or symbol error ratio (SER) within a communication system. The Shannon limit is the theoretical bound for channel capacity for a given modulation and code rate. The ideal goal has been to try to reach Shannon's channel capacity limit in a communication channel. Shannon's limit may be viewed as being the maximum data rate per unit of bandwidth (i.e., spectral efficiency) to be used in a communication channel, having a particular SNR, where transmission through the communication channel with arbitrarily low BER or SER is achievable. Conventional and prior art technologies do not adequately provide for optimum communication system performance and leave much room for improvement.

BRIEF DESCRIPTION OF THE SEVERAL VIEWS OF THE DRAWINGS

FIG. 1A is a diagram illustrating an embodiment of one or more communication systems.

FIG. 1B is a diagram illustrating another example of a communication device operative within one or more communication systems.

FIG. 1C is a diagram illustrating an example of at least a portion of a communication device operative within one or more communication systems.

FIG. 1D is a diagram illustrating another example of at least a portion of a communication device operative within one or more communication systems.

FIG. 2A is a diagram illustrating an example of various modulations based on various constellations.

FIG. 2B is a diagram illustrating an example of one-dimensional (1D) decision feedback equalizer (DFE).

FIG. 2C is a diagram illustrating an example of a modulation based on a pulse amplitude modulation (PAM)-3 constellation.

FIG. 3A illustrates an example of an LDPC (Low Density Parity Check) code bipartite graph.

FIG. 3B illustrates an example of decoding of an LDPC coded signal.

FIG. 3C illustrates an example of an LDPC matrix that is partitioned into sub-matrices.

FIG. 5A is a diagram illustrating an example of an LDPC matrix of an LDPC code.

FIG. 5B is a diagram illustrating an example of a communication device configured to perform LDPC encoding and puncturing.

FIG. 5C is a diagram illustrating an example of a communication device configured to perform bit filling, LDPC encoding, shortening, and puncturing.

DETAILED DESCRIPTION

Figure 4A:
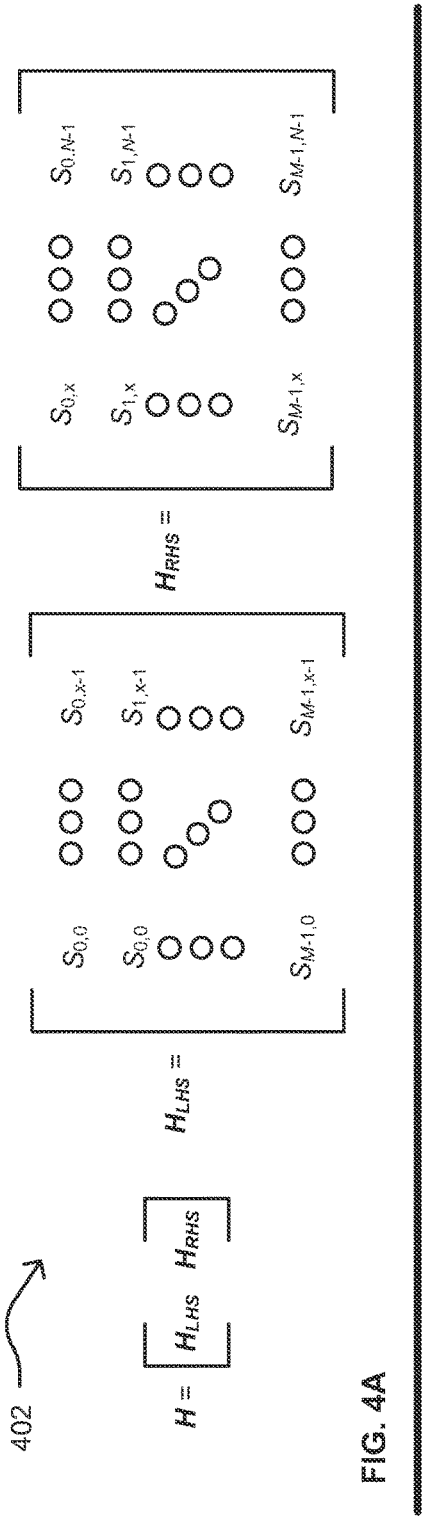
FIG. 4A is a diagram illustrating an example of an LDPC matrix partitioned into a left hand side matrix and a right hand side matrix.

FIG. 1A is a diagram illustrating an embodiment 101 of one or more communication systems. One or more network segments 116 provide communication inter-connectivity for at least two communication devices 110 and 112 (also referred to as communication devices in certain locations in the diagrams). Note that general reference to a communication device may be made generally herein using the term 'device' (e.g., device 110 or CD 110 when referring to communication device 110, or devices 110 and 112, or CDs 110 and 112, when referring to communication devices 110 and 112; note that CD is used in certain diagrams for brevity). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of implementation, device 110 includes a communication interface to support communications with one or more of the other devices 112-114. This communication may be bidirectional/to and from the one or more of the other devices 112-114 or unidirectional (or primarily unidirectional) from the one or more of the other devices 112-114.

In another example of implementation, device 110 includes a communication interface and/or a processor (and possibly other possible circuitries, components, elements, etc.) to support communications with other device(s) and to generate and process signals for such communications. The communication interface and/or the processor operate to perform various operations and functions to effectuate such communications.

In an example of operation, one of the devices, such as device 110, includes a communication interface and/or a processor that operate to support communications with another device, such as device 112, among others within the system. For example, the processor is operative to generate and interpret different signals, frames, packets, symbols, etc. for transmission to other devices and that have been received from other devices.

In an example of operation, the device 110 receives signals from a communication channel and processes the signals to generate two-dimensional (2D) decision feedback equalizer (DFE) soft slicer outputs. The device 110 then decodes the signals based on the 2D DFE soft slicer outputs to generate estimates of information encoded within the signals.

In another example of operation, the device 110 receives signals from a communication channel and processes the signals to determine 2D DFE configuration parameters for a 2D DFE used to process the signal. The determination of the 2D DFE configuration parameters can be based on and performed during processing of the signals. For example, certain of the 2D DFE configuration parameters can be set to start-up, default, etc. value(s). The device 110 then generates 2D DFE soft slicer outputs using a 2D DFE function based on the 2D DFE configuration parameters, a 2D constellation of the signals that includes constellation points arranged respectively in predetermined locations (e.g., constellation points having a particular shape, with each constellation point having a respective label, etc.), and a cost function that is based on noise and/or interference associated with the communication channel. Examples of such noise and/or interference can include additive white Gaussian noise (AWGN), narrowband interference (NBI), burst noise, impulse noise, electromagnetic interference (EMI), inter-symbol interference (ISI), inter-code interference (ICI), and/or any other type of noise and/or interference.

In another example of operation, the device 110 receives signals from a communication channel and processes the signals to determine 2D DFE configuration parameters and generates a first 2D DFE soft slicer output that is associated with a first dimension of a 2D constellation based on a first signal and a 2D DFE function as calculated based on the 2D DFE configuration parameters. The device also generates intermediate soft information using a cost function that is based on AWGN and/or NBI associated with the communication channel. The device 110 then generates a second 2D DFE soft slicer output that is associated with a second dimension of the 2D constellation based on a second signal and the 2D DFE function as calculated based on the intermediate soft information and at least some of the 2D DFE configuration parameters. Note that the same 2D DFE function can be calculated using different value(s), parameter(s), etc. at different times and/or based on different conditions.

In another example of operation, the device 110 processes 2D DFE soft slicer outputs to generate log-likelihood ratios (LLRs) and decodes the signals using the LLRs to generate the estimates of the information encoded within the signals.

In another example of operation, the device 110 processes the 2D DFE soft slicer outputs to generate symbol metrics based on a 2D constellation of the signals. The device 110 then processes the symbol metrics to generate LLRs and decodes the signals using the LLRs based on an low density parity check (LDPC) code to generate the estimates of the information encoded within the plurality of signals. In general, any type of forward error correction (FEC) code and/or error checking and correction (ECC) code may be used within such a communication device and/or system that operates using a 2D DFE soft slicer and its equivalents as described herein. In a particular example of an FEC code and/or ECC code that is LDPC, the device 110 decodes the signals using an LDPC matrix associated with the LDPC code to generate the estimates of the information encoded within the signals. The LDPC matrix includes sub-matrices arranged in a left hand side matrix and a right hand side matrix such that the right hand side matrix is lower triangular and includes all-zero-valued sub-matrices except for CSI (Cyclic Shifted Identity) sub-matrices located on a main diagonal of the right hand side matrix and another diagonal that is adjacently located to a left of the main diagonal. Examples of such an LDPC matrix are described below.

In another example of operation, the device 110 processes the 2D DFE soft slicer outputs to generate 2D DFE hard decisions and generates estimates of the information encoded within the signals based on the 2D DFE hard decisions.

FIG. 1B is a diagram illustrating another example 102 of a communication device operative within one or more communication systems. The device 110 includes a communication interface 120 and a processor 130. The communication interface 120 includes functionality of a transmitter 122 and a receiver 124 to support communications with one or more other devices within a communication system. The device 110 may also include memory 140 to store information including one or more signals generated by the device 110 or such information received from other devices (e.g., device 112) via one or more communication channels. Memory 140 may also include and store various operational instructions for use by the processor 130 in regards to the processing of messages and/or other received signals and generation of other messages and/or other signals including those described herein. Memory 140 may also store information including one or more types of encoding, one or more types of symbol mapping, concatenation of various modulation coding schemes, etc. as may be generated by the device 110 or such information received from other devices via one or more communication channels. The communication interface 120 supports communications to and from one or more other devices (e.g., CD 112 and/or other communication devices). Operation of the communication interface 120 may be directed by the processor 130 such that processor 130 transmits and receives signals (TX(s) and RX(s)) via the communication interface 120.

Generally speaking, the communication interface 120 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and or frequency downscaling, such as to a baseband frequency at which one or more of the components of the device 110 operates), equalization, pre-equalization, metric generation, symbol mapping and/or de-mapping, automatic gain control (AGC) operations, and/or any other operations that may be performed by an AFE and/or PHY component within a communication device.

Note that device 110 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system.

Also, in some examples, note that one or more of the processor 130, the communication interface 120 (including the TX 122 and/or RX 124 thereof), and/or the memory 140 may be implemented in one or more "processing modules," "processing circuits," "processors," and/or "processing units". Considering one example, one processor 130a may be implemented to include the processor 130, the communication interface 120 (including the TX 122 and/or RX 124 thereof), and the memory 140. Considering another example, two or more processors may be implemented to include the processor 130, the communication interface 120 (including the TX 122 and/or RX 124 thereof), and the memory 140. In such examples, such a "processor" or "processors" is/are configured to perform various operations, functions, communications, etc. as described herein. In general, the various elements, components, etc. shown within the device 110 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

Note that the device 110 and/or one or more communication channels with which the device 110 may be subject to and/or affected by various deleterious effects including noise and/or interference (e.g., AWGN, NBI, burst noise, impulse noise, electromagnetic interference (EMI), inter-symbol interference (ISI), inter-code interference (ICI), and/or any other type of noise and/or interference). In some implementations, the device 110 includes a two-dimensional (2D) decision feedback equalizer (DFE and/or performs operations of a 2D DFE (e.g., such as within and/or by using the processor 130, 130a, and/or other components within the device 110, etc.). In general, the device 110 performs various function, operations, etc. as described herein and their equivalents. The device 110 can perform equalization using such a 2D DFE to compensate for, mitigate, reduce, and/or eliminate the deleterious effects incurred within such communications.

In an example of operation, the processor 130a receives signals from a communication channel and processes the signals to generate two-dimensional (2D) decision feedback equalizer (DFE) soft slicer outputs. The processor 130a then decodes the signals based on the 2D DFE soft slicer outputs to generate estimates of information encoded within the signals.

In another example of operation, the processor 130a receives signals from a communication channel and processes the signals to determine 2D DFE configuration parameters for a 2D DFE used to process the signal. The determination of the 2D DFE configuration parameters can be based on and performed during processing of the signals. For example, certain of the 2D DFE configuration parameters can be set to start-up, default, etc., value(s). The processor 130a then generates 2D DFE soft slicer outputs using a 2D DFE function based on the 2D DFE configuration parameters, a 2D constellation of the signals, and a cost function that is based on noise and/or interference associated with the communication channel.

In another example of operation, the processor 130a receives signals from a communication channel and processes the signals to determine 2D DFE configuration parameters and generates first and second 2D DFE soft slicer outputs that are associated with first and second dimensions of a 2D constellation. The first 2D DFE soft slicer output is based on a first signal and a 2D DFE function as calculated based on the 2D DFE configuration parameters. The device also generates intermediate soft information using a cost function that is based on AWGN and/or NBI associated with the communication channel. The device 110 then generates the second 2D DFE soft slicer output based on a second signal and the 2D DFE function as calculated based on the intermediate soft information and at least some of the 2D DFE configuration parameters.

In another example of operation, the device 110 processes 2D DFE soft slicer outputs to generate LLRs and decodes the signals using the LLRs to generate the estimates of the information encoded within the signals.

In another example of operation, the processor 130a processes the 2D DFE soft slicer outputs to generate symbol metrics based on a 2D constellation of the signals. The device 110 then processes the symbol metrics to generate LLRs and decodes the signals using the LLRs based on an LDPC code to generate the estimates of the information encoded within the plurality of signals.

In another example of operation, the processor 130a processes the 2D DFE soft slicer outputs to generate 2D DFE hard decisions and generates estimates of the information encoded within the signals based on the 2D DFE hard decisions.

Note that device 110 may be configured to perform encoding of one or more bits to generate one or more coded bits used to generate the modulation data (or generally, data). For example, a processor and/or the communication interface of a communication device (e.g., communication interface 120, processor 130 and/or processor 130a, etc.) may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 1C is a diagram illustrating an example 103 of at least a portion of a communication device operative within one or more communication systems. An analog front end (AFE)/demodulator 150 receives one or more signals (RX signal(s)) from one or more communication channels and generates a demodulated signal based thereon. A 2D DFE 152 process the demodulated signal to generate 2D DFE soft slicer outputs (e.g., 2D DFE soft slicer outputs and/or 2D DFE hard decisions). A log-likelihood ratio (LLR) calculator 154 processes the 2D DFE soft slicer outputs to generate LLRs, and a decoder 156 decodes the signals using the LLRs to generate estimates of information encoded within the signals.

FIG. 1D is a diagram illustrating another example 104 of at least a portion of a communication device operative within one or more communication systems. In some examples, this at least a portion of a communication device may be viewed as being portions of the receiver 124 of the communication interface 120, the processor 130, and/or the processor 130a of the device 110 such as described with reference to FIG. 1B.

The device receives one or more continuous-time receive signals from one or more communication channels. AFE 150 receives the one or continuous-time receive signals and generates a demodulated signal based thereon. The AFE 150 includes a receive filter 162 (e.g., channel filter, bandpass filter, notch filter, low pass filter, high pass filter, etc.) that filters the one or continuous-time receive signals. ADC 164 converts the continuous-time receive signal into discrete-time receive signals. A metric generator (MG) or symbol de-mapper (SDM) 170 calculates metrics (e.g., on either a symbol and/or bit basis, which may be log-likelihood ratios (LLRs) or other types of metrics). For example, metrics may be viewed as estimated constellation points on a constellation map of a 2D constellation.

The MG or SDM 170 includes 2D DFE 152 that generates 2D DFE soft slicer outputs (e.g., 2D DFE soft slicer outputs and/or 2D DFE hard decisions). LLR calculator 154 processes the 2D DFE soft slicer outputs to generate LLRs, and decoder 156 decodes the signals using the LLRs to generate estimates of information encoded within the signals. The decoder 156 (e.g., that essential performs inverse operations of an encoder in a transmitter device that transmits one or more continuous-time signals to the device 110) interprets the metrics to create estimates of information bits encoded therein.

Note that encoding and symbol mapping as well as metric generation and decoding within a 112 and a receiver, respectively, may be performed using any of the various FEC, ECC, etc. The operations performed a receiver, as related to metric generation and decoding, are performed based on the type of operations performed within the transmitter, as related to encoding symbol mapping. For example, metric generation and decoding within receiver may be performed based on a type of FEC, ECC, etc. that is employed to perform encoding symbol mapping within transmitter.

FIG. 2A is a diagram illustrating an example 201 of various modulations based on various constellations. Different modulations are shown based on different sized symbols. Quadrature phase shift keying (QPSK) or 4-quadrature amplitude modulation (QAM) includes 4 constellation points located respectively within the four quadrants of a constellation with axes of in-phase (horizontal) and quadrature (vertical). Each constellation point corresponds to a given 2-bit label or 2-bit symbol (e.g., a first constellation point associated with symbol value 00, a second constellation point associated with symbol value 01, a third constellation point associated with symbol value 10, and fourth constellation point associated with symbol value 11). In some instances, the four constellation points of QPSK or 4-QAM are merely a subset of constellation points associated with a higher ordered modulation that includes more than one constellation point in each quadrant. For example, one constellation point may be selected within each quadrant based on a higher ordered modulation.

8-phase shift keying (PSK) includes 8 constellation points, and each constellation point corresponds to a respective 3-bit label or 3-bit symbol (e.g., 000, 001, 010, and so on up to 111).

Pulse amplitude modulation (PAM)-3 (PAM-3) includes 8 constellation points, and each constellation point corresponds to a respective 3-bit label or 3-bit symbol (e.g., 000, 001, 010, and so on up to 111).

16-QAM includes 16 constellation points, and each constellation point corresponds to a respective 4-bit label or 4-bit symbol (e.g., 0000, 0001, 0010, and so on up to 1111).

32-QAM includes 32 constellation points, and each constellation point corresponds to a respective 5-bit label or 5-bit symbol (e.g., 00000, 0001, 00010, and so on up to 11111).

Other higher ordered modulations may also be employed, such as 64-QAM, 128-QAM, 256-QAM, etc. and/or even higher ordered modulations including larger numbers of constellation points. Note also that different shaped constellations may be used for bit labels or symbols of a given size. As an example, another option for a modulation based on 5-bit labels or 5-bit symbols is 32 amplitude and phase shift keying (APSK) (e.g., two concentric circles of modulation points, such as an outer ring of modulation points encircling the constellation points of an 8-PSK modulation, for total of 32 constellation points within the modulation).

Note also that a given modulation has both a number of constellation points and associated mapping of the constellation points themselves (e.g., a respective bit label for each constellation point). Note that the mapping associated with a modulation may vary as a function of time. That is to say, the constellation points of the given modulation may have a first mapping at a first time, and a second mapping a second time. This can provide for yet another degree of freedom and flexibility to adapt to different operational modes.

The modulations referenced here is not an exhaustive list of all possible modulations known, and the reader will understand that any desired modulation type, mapping, shape, etc. may be employed in certain embodiments.

FIG. 2B is a diagram illustrating an example 202 of one-dimensional (1D) decision feedback equalizer (DFE). Such a 1D DFE may be implemented to include a multiple tap delay line (equalizer). Such a multiple tap delay line (equalizer) operates using some subset of the total available taps and operates such that an input signal, $r_n$, is updated or modified based on feedback from prior values of that same input signal, $r_n$, that are fed back via a weighted tap delay line (shown by delay elements "D" and adjustable amplifiers/weighting blocks "$h_i$", i=1 ... L, where L is the size or length of the 1D DFE) that reduces deleterious effects (e.g., interference, noise, etc.) that modify the signal.

Operation of such a 1D DFE model may be described as follows:

Assume previous decision $b_{n-1}$, $b_{n-2}$, $b_{n-L}$, are known as the output from each of the respective delay elements "D".

Let $$\alpha_n \sum_{i=1}^{L} h_i \cdot b_{n-i}$$

and $$\beta_n \sum_{i=2}^{L} h_i \cdot b_{n+1-i}.$$

Note for certain modulations (e.g., a PAM-3 (pulse amplitude modulation (PAM)-3 modulation), these operations are all additions. Such operations can allow for relatively low complex implementation.

The DFE inputs ($r_n$, $r_{n+1}$), slicer inputs ($y_n$, $y_{n+1}$), and slicer outputs ($b_n$, $b_{n+1}$) are as follows:

$y_n=r_n-\alpha_n=b_n+w_n$ gives $w_n=y_n-b_n$, and
$y_{n+1}=r_{n+1}-\beta_n=b_{n+1}+w_{n+1}$ gives $w_{n+1}=y_{n+1}-b_{n+1}$.

The values of $\alpha_n$ and $\beta_n$ are used respectively to generate the values of the slicer inputs ($y_n$, $y_{n+1}$) based on the DFE inputs ($r_n$, $r_{n+1}$). The noise associated with the slicer inputs DFE inputs ($r_n$, $r_{n+1}$), ($y_n$, $y_{n+1}$), and/or slicer outputs/signal ($b_n$, $b_{n+1}$) are characterized as ($w_n$, $w_{n+1}$). The signal is ($b_n$, $b_{n+1}$), and noise is ($w_n$, $w_{n+1}$).

FIG. 2C is a diagram illustrating an example 203 of a modulation based on a pulse amplitude modulation (PAM)-3 constellation.

A 2D DFE is presented herein which is an extension of such a 1D DFE.

Considering a 2D DFE, the inputs and outputs of such a 2D DFE are as follows:

Input ($r_0$,$r_1$), ($r_2$,$r_3$), . . . , ($r_{2(k-1)}$,$r_{2k-1}$)
Output ($y_{0,0}$, $y_{0,1}$), . . . ($y_{k-1,0}$, $y_{k-1,1}$)

Consider that L is number of adjustable gains for the total number of taps of the 2D DFE (e.g., ranging from 0 to L−1), and D's are the delay elements of the tapped delay line and values therein are register values (e.g., shown as reg[ ] herein).

The formula, f, is the DFE function. The resultant value of this formula, f, is what is fed back to modify the input(s) (e.g., subsequent input(s)) to the 2D DFE.

8 constellation signal values: ($u_{i,0}$,$u_{i,1}$), i=0, 1, . . . , 7
Size L DFE function:

$$f(h, reg[0], \ldots , reg[L-1]) = \sum_{i=0}^{L-1} h_i * reg[i], h = (h_0, \ldots , h_{L-1})$$

Initialization: $reg_{-1}[i]$=0, i=0, . . . , L−1 and n=0
For n=1, 2, . . . do the following
Received signals ($r_{2n}$, $r_{2n+1}$) and output signal ($y_{n,0}$, $y_{n,1}$)

Step 1: Compute $y_{n,0}=r_{2n}-f(h,reg_{2n-1}[0], \ldots , reg_{2n-1}[L-1])$
let $reg_{2n}[i]=reg_{2n-1}[i-1]$, i=1, . . . L−1, and
$w_{n,i}=u_{i,0}-y_{n,0}$, i=0, . . . , 7
Step 2: Compute $y_{n+1,i}=r_{2n+1}-f(h, u_{i,0}, reg_{2n}[1], \ldots , reg_{2n}[L-1])$, i=0, . . . , 7
Let $w_{n+1,i}=u_{i,1}-y_{n+1,i}$, i=0, . . . , 7
Step 3: For i=0, . . . , 7 compute cost function $$J_i = \frac{1}{(c_0\sigma_{AWGN}^2 + c_1\sigma_{NBI}^2)}[w_{n,i}, w_{n+1,i}]\begin{bmatrix} 1 & -c \\ -c & 1 \end{bmatrix}\begin{bmatrix} w_{n,i} \\ w_{n+1,i} \end{bmatrix}$$

and
probability:

$$p_i = \frac{\exp(-J_i)}{\sum_{j=0}^{7} \exp(-J_j)}$$

and let $$(soft_0, soft_1) = \sum_{i=0}^{7} p_i * (u_{i,0}u_{i,1})$$

Step 4: Compute $y_{n,1}=r_{2n+1}-f(h, soft_0, reg_{2n}[1], \ldots , reg_{2n}[L-1])$ and let
$reg_{2n+1}[i]=reg_{2n}[i-1]$, i=1, . . . , L−1 and $reg_{2n+1}[0]=soft_1$ In an example of operation, all register values are initialized to 0 (e.g., $reg_{-1}[i]$=0, i=0, . . . , L−1 and n=0).

The 2D DFE receives 2 signals of a given 2D constellation, ($r_{2n}$, $r_{2n+1}$), and outputs ($y_{n,0}$, $y_{n,1}$). These successive values may be viewed as corresponding to 2 signals (e.g., first and second dimensions, such as I,Q, such as In-phase and Quadrature signals), and the outputs may be viewed as corresponding to 2 signals (e.g., first and second dimensions, such as I,Q, such as In-phase and Quadrature signals). Such I,Q may be viewed as corresponding to a 2D constellation.

In Step 1 above, the 2D DFE calculates a first dimension (e.g., horizontal, I value of I,Q values). The 2D DFE computes a first dimension of the 2D output of the constellation point, $y_{n,0}$, such as with respect to the horizontal, I value of I,Q values. This is computed by the different difference between the received signal, $r_{2n}$, and the 2D DFE function, f(h, $reg_{2n-1}[0]$, . . . , $reg_{2n-1}[L-1]$), as follows:
$y_{n,0}=r_{2n}-f(h, reg_{2n-1}[0], \ldots , reg_{2n-1}[L-1])$.
Then, the 2D DFE shifts the registers as follows:
$reg_{2n}[i]=reg_{2n-1}[i-1]$, i=1, . . . , L−1.
Then, the 2D DFE calculates, $w_{n,i}=u_{i,0}-y_{n,0}$, i=0, . . . , 7, which is a difference between the ideal constellation values of the 2D constellation and associated modulation (e.g., $u_{i,0}$) along the first dimension (e.g., horizontal, I value of I,Q values) of the 2D constellation. Considering a PAM-3 constellation as with respect to FIG. 2B, these values, $u_{i,0}$, are the ideal constellation values (−1, 0, +1) along the horizontal axis of the constellation that includes 8 points in this case (e.g., the center shown/dashed constellation is not included). Note that such values, $u_{i,0}$, could alternatively be for any constellation.

In Step 2 above, the 2D DFE calculates $y_{n+1,i}$. This is calculated as the difference between the received signal, $r_{2n+1}$, and the 2D DFE function, f(h, $u_{i,0}$, $reg_{2n}[1]$, . . . , $reg_{2n}[L-1]$), as follows:
$y_{n+1,i}=r_{2n+1}-f(h, u_{i,0}, reg_{2n}[1], \ldots , reg_{2n}[L-1])$, i= 0, . . . , 7.

This will give a number of values corresponding to the number of constellation points in the constellation (e.g., 8 values for a PAM-3 constellation). Then, the 2D DFE calculates, $w_{n+1,i}=u_{i,1}-y_{n+1,i}$, $i=0, \ldots, 7$, which is which is a difference between the ideal constellation values of the 2D constellation and associated modulation (e.g., $u_{i,1}$) along the second dimension (e.g., vertical, Q value of I,Q values) of the 2D constellation. Considering a PAM-3 constellation as with respect to FIG. 2B, these values, $u_{i,1}$, are the ideal constellation values (−1, 0, +1) along the vertical axis of the constellation that includes 8 points in this case (e.g., the center shown/dashed constellation is not included). Note that such values, $u_{i,1}$ $u_{i,0}$, could alternatively be for any constellation.

In Step 2 above, the 2D DFE calculates a cost function, $J_i$. For $i=0, \ldots, 7$ compute cost function $$J_i = \frac{1}{(c_0 \sigma_{AWGN}^2 + c_1 \sigma_{NBI}^2)} [w_{n,i}, w_{n+1,i}] \begin{bmatrix} 1 & -c \\ -c & 1 \end{bmatrix} \begin{bmatrix} w_{n,i} \\ w_{n+1,i} \end{bmatrix}$$

and
probability:

$$p_i = \frac{\exp(-J_i)}{\sum_{j=0}^{7} \exp(-J_j)}$$

and let $$(soft_0, soft_1) = \sum_{i=0}^{7} p_i * (u_{i,0} u_{i,1})$$

Note that the cost function, $J_i$, can vary as a function of the variance of narrowband interference (NBI), $\sigma_{NBI}^2$, and also the variance of additive white Gaussian noise (AWGN), $\sigma_{AWGN}^2$, as well as selected scale values, $c_0$ and $c_1$. Note that such values can change over time but will be known or predetermined before performing decoding using results from the 2D DFE. The values, $c_0$ and $c_1$, may be viewed as being associated with signal to noise ratio (SNR) values, the communication channel transfer function (e.g., H) value, which is associated with the SNR of the communication channel, and also the h values, e.g., the number of adjustable gains for each tap (h, 0 though L−1).

Note that the value, c, is related to the h values and also on the location in frequency and/or magnitude of the narrowband interference (NBI) frequency. Note that the h values are dynamic and can change as a function of channel conditions, but they are fixed at a given time for these calculations/steps. The resultant will be a number of cost function, $J_i$, corresponding to the number of constellation points (e.g., 8 values in case of a PAM-3 constellation). Also, a same number of probabilities are calculated as follows:

$$p_i = \frac{\exp(-J_i)}{\sum_{j=0}^{7} \exp(-J_j)},$$

(e.g., 8 values in case of a PAM-3 constellation).

The 2D DFE then calculates the values, ($soft_0$, $soft_1$). These are the 2D soft DFE values/results.

In Step 4 above, the 2D DFE calculates a second dimension (e.g., vertical, Q value of I,Q values). The 2D DFE computes a second dimension of the 2D output of the constellation point, $y_{n,1}$, such as with respect to the vertical, Q value of I,Q values. This is computed by the difference between the received signal, $r_{2n}$, and the 2D DFE function, $f(h, soft_0, reg_{2n}[1], \ldots, reg_{2n}[L-1])$, this time that is based at least in part on the intermediate soft information, $soft_0$, as follows:

$y_{n,1}=r_{2n+1}-f(h, soft_0, reg_{2n}[1], \ldots, reg_{2n}[L-1])$.

Then, the 2D DFE shifts the registers as follows:

$reg_{2n+1}[i]=reg_{2n}[i-1]$, $i=1, \ldots, L-1$ and $reg_{2n+1}[0]=soft_1$.

Note that the register value of the last register, $reg_{2n+1}[0]$, is filled with the intermediate soft information, $soft_1$.

Then, the 2D DFE has the values, $y_{n,0}$ and $y_{n,1}$, which are the 2D soft slicer outputs from the 2D DFE. In some examples, a device processes the signals based on such 2D DFE processing to generate these 2D DFE soft slicer outputs decodes the signals based on the 2D DFE soft slicer outputs to generate estimates of information encoded within the plurality of signals.

In some other examples, a device processes the signals based on such 2D DFE processing to determine 2D DFE configuration parameters and generates the 2D DFE soft slicer outputs using a 2D DFE function based on the plurality of 2D DFE configuration parameters, a 2D constellation of the signals, and a cost function that is based on noise and/or interference associated with the communication channel.

In some other examples, a device processes the 2D DFE soft slicer outputs to generate 2D DFE hard decision and generates estimates of information encoded within the signals based on the 2D DFE hard decisions.

In an example of operation of such decision processing, a device performs Step 1 above but runs the value of the first dimension of the 2D output of the constellation point, $y_{n,0}$, such as with respect to the horizontal, I value of I,Q values through a slicer to get a hard decision associated with the first dimension of the 2D output of the constellation.

With respect to the calculation of the probabilities, the device selects the minimum value that gives the minimal cost function value among the values of the cost function, J and the device then outputs the associated values, $u^*_{i,0}, u^*_{i,1}$, as the 2D DFE hard decisions. Then, with respect to Step 4, the device operates by using these 2D DFE hard decisions, $u^*_{i,0}, u^*_{i,1}$, instead of the values, $soft_0$, $soft_1$. The device then uses the hard decision instead of soft information and runs it through a slicer to get a hard decision associated with the second dimension of the 2D output of the constellation (e.g., the vertical, Q value of I,Q values).

In an example of operation, a device receives signals, then demodulates them and provides the demodulated results to a 2D DFE, and the generates 2D soft slicer outputs as function of the modulation/constellation, and then performs LLR calculation based on the 2D soft slicer outputs. The device then decodes the signal using the LLRs to generate bit/symbol estimates of information encoded within the signals. Note also that the 2D DFE processing described above can be extended to any types of communications that may operates using any type of 2D constellation. Note also that the 2D DFE processing can be extended to N-D DFE processing that can extend to multi-dimensional modulations and/or signaling schemes (e.g., 3-D, 4-D, or generally N-D, where N is any positive integer greater than or equal to 2).

In an example of operation, the device computes LLRs for a decoder (e.g., an LDPC decoder). The device computes a 3-bit symbol metric as follows:

$$metric_i(n) = \frac{1}{(c_0\sigma_{AWGN}^2 + c_1\sigma_{NBI}^2)}[y_{n,0} - u_{i,0}\ y_{n,1} - u_{i,1}]\begin{bmatrix} 1 & -c' \\ -c' & 1 \end{bmatrix}\begin{bmatrix} y_{n,0} - u_{i,0} \\ y_{n,1} - u_{i,1} \end{bmatrix}.$$

The device then use the symbol metric to compute the bit level LLRs.

Note that any of a variety of FEC codes and/or ECC codes may be used in conjunction with such a communication device and/or communication systems as described herein, and details regarding one type of code, LDPC codes, are provided below.

FIG. 3A illustrates an example 301 of an LDPC (Low Density Parity Check) code bipartite graph. An LDPC bipartite graph is sometimes be referred to as a "Tanner" graph. An LDPC bipartite graph is a pictorial representation of an LDPC matrix of a corresponding LDPC code, and it shows the relationship of non-null elements of the LDPC matrix that performs bit or variable edge message updating (based on columns of the LDPC matrix) and check message updating (based on rows of the LDPC matrix). An LDPC code is characterized by a binary parity check matrix (i.e., LDPC matrix) that is sparse, such that nearly all of the elements of the matrix have values of zero ("0"). For example, $H = (h_{i,j})_{M \times N}$ is a parity check matrix of an LDPC code with block length N. The LDPC bipartite graph, or "Tanner" graph, is a pictorial illustration of an LDPC matrix.

LDPC codes are linear block codes and hence the set of all codewords $x \in C$ spans the null space of a parity check matrix, H, as follows:

$$Hx^T = 0, \forall x \in C \qquad (1)$$

For an LDPC code, the matrix, H, is a sparse binary matrix of dimension m×n. Each row of H corresponds to a parity check and a set element $h_{ij}$ indicates that data symbol j used for the parity check i. Each column of H corresponds to a codeword symbol.

For each codeword x, there are n symbols of which m are parity symbols. Hence the code rate of the LDPC code, r, is provided as follows:

$$r = (n-m)/n \qquad (2)$$

The row and column weights are defined as the number of set elements in a given row or column of H, respectively. The set elements of H are chosen to satisfy the performance requirements of the code. The number of 1's in the i-th column of the parity check matrix, H, may be denoted as $d_v(i)$, and the number of 1's in the j-th row of the parity check matrix may be denoted as $d_c(j)$. If $d_v(i) = d_v$ for all i, and $d_c(j) = d_c$ for all j, then the LDPC code is called a $(d_v, d_c)$ regular LDPC code, otherwise the LDPC code is called an irregular LDPC code.

A regular LDPC code can be represented as a bipartite graph by its parity check matrix with left side nodes representing variable of the code bits (or alternatively as the "variable nodes" (or "bit nodes") 361 in a bit-based decoding of LDPC coded signals), and the right side nodes representing check equations (or alternatively as the "check nodes" 362). The bipartite graph (or Tanner graph) of the LDPC code defined by H may be defined by N variable nodes (e.g., N bit nodes) and M check nodes. Every variable node of the N variable nodes 361 has exactly $d_v(i)$ edges. As an example, edge 367 connects the bit node, $v_i$ 365, to one or more of the check nodes (within the M check nodes). The edge 367 is specifically shown as connecting from the bit node, $v_i$ 365, to the check node, $c_j$ 366. This number of $d_v$ edges (shown as $d_v$ 363) may be referred to as the degree of a variable node i. Analogously, a check node of the M check nodes 362 has $d_c(j)$ edges (shown as $d_c$ 364) connecting this node to one or more of the variable nodes (or bit nodes) 361. This number of edges, $d_c$ 364, may be referred to as the degree of the check node j.

An edge 367 between a variable node $v_i$ (or bit node $b_i$) 365 and check node $c_j$ 366 can be defined by e=(i,j). Alternatively, given an edge e=(i,j), the nodes of the edge may alternatively be denoted as by e=(v(e), c(e)) (or e=(b(e), c(e))). The edges in the graph correspond to the set elements of H where a set element $h_{ji}$ indicates that an edge connects a bit (e.g., variable) node i with parity check node j.

Given a variable node $v_i$ (or bit node $b_i$), one may define the set of edges emitting from the node $v_i$ (or bit node $b_i$) by $E_v(i) = \{e|v(e)=i\}$ (or by $E_b(i) = \{e|b(e)=i\}$); these edges are referred to as bit edges, and the messages corresponding to these bit edges are referred to as bit edge messages.

Given a check node $c_j$, one may define the set of edges emitting from the node $c_j$ by $E_c(j) = \{e|c(e)=j\}$; these edges are referred to as check edges, and the messages corresponding to these check edges are referred to as check edge messages. Continuing on, the derivative result will be $|E_v(i)| = d_v$ (or $|E_b(i)| = d_b$) and $|E_c(j)| = d_c$.

Generally speaking, any such codes (e.g., LDPC codes) that can be represented by a bipartite graph may be characterized as a graph code. It is also noted that an irregular LDPC code may also be described using a bipartite graph. However, the degree of each set of nodes within an irregular LDPC code may be chosen according to some distribution. Therefore, for two different variable nodes, $v_{i_1}$ and $v_{i_2}$, of an irregular LDPC code, $|E_v(i_1)|$ may not be equal to $|E_v(i_2)|$. This relationship may also hold true for more than one (e.g., two) check nodes.

Note that terminology such as that of "bit node" and "bit edge message", or equivalents thereof, may be used in the art of LDPC decoding. With respect to LDPC decoding, note that "bit node" and "bit edge message" are alternatively referred to as "variable node" and "variable edge message", respectively. Note that LDPC decoding operates to make one or more estimates of the bit values (or variable values) encoded within an LDPC coded signal.

FIG. 3B illustrates an example 302 of decoding of an LDPC coded signal. Within a communication device (e.g., communication device 110), a signal received from a communication channel undergoes appropriate demodulation (e.g., processing within an analog front end including digital sampling, digital to analog conversion, filtering, frequency conversion (up or down), gain adjustment and/or scaling, etc.) to generate a received bit sequence. Then, a metric generator 371 calculates log-likelihood ratios (LLRs) for each bit location within the received bit sequence. These LLRs correspond initially to the bit nodes 361 of the LDPC code and its corresponding LDPC bipartite graph that represents the LDPC matrix used to decode the signal.

In an example of LDPC decoding, during initialization, the LLRs are employed for the bit edge messages (e.g., extrinsic information) of the edges extending from the respective bit/variable nodes. Thereafter, one or more decoding cycles or iterations may be performed based on check node processing and bit node processing (iterative decoding 372). Check node processing or check node updating is performed using the original bit edge messages (e.g., the calculated LLRs) such as by a check node processor 374. A bit/variable node processor 373 then uses these updated check edge messages to perform bit node processing or bit node updating to update the variable node soft information for use in the next decoding iteration. The most recently updated variable bit/node soft information is then used to calculate the variable node edge messages (extrinsic information) for this next decoding iteration. The check node processor 374 performs check message updating (based on rows of the LDPC matrix) to generate updated check edge messages, and the bit/variable node processor 373 performs bit or variable edge message updating (based on columns of the LDPC matrix) as also described with reference to FIG. 3A.

When more than one decoding iteration is performed, these variable node edge messages are then used by the check node processor 374 for subsequent check node processing or check node updating to calculate updated check edge messages. Then, bit/variable node processor 373 uses the most recently updated check edge messages to perform bit node processing or bit node updating to update the variable node soft information once again. After a final decoding iteration, which may be determined based on some parameter (e.g., a predetermined number of decoding iterations or when all syndromes of the LDPC code equal zero, as determined by syndrome calculator 376), the last calculated variable node soft information may undergo hard limiting (e.g., in a slicer or hard limiter 375) to generate one or more estimates of one or more bits encoded within the LDPC coded signal.

Generally speaking, this approach for decoding of LDPC coded signals may be referred to as a message passing approach (or iterative message passing approach). Note that LDPC decoding may be performed in any of a variety of architectures including parallel decoding architectures, layer decoding architectures etc. Device 110 may be implemented to perform encoding and/or decoding of LDPC coded signal using any desired approach or architecture.

Note that the various functional blocks and components depicted in FIG. 1B may be implemented or performed by the processor 130 (and memory 140) of communication device 110 or alternatively, processor 130a. For example, the processor 130 can be implemented to perform such decoding operations and the memory 140 can be implemented to store and perform memory management for the various bit/variable and check edge messages, variable bit/node soft information, extrinsic information, etc. used in the decoding operations.

FIG. 3C illustrates an example 303 of an LDPC matrix that is partitioned into sub-matrices. This diagram shows the relationship between an overall LDPC matrix and the individual sub-matrices therein that can be all zero-valued sub-matrices and/or CSI (Cyclic Shifted Identity) sub-matrices, and the diagram shows the sub-matrix rows and sub-matrix columns of the LDPC matrix that correspond to the sub-matrix arrangement of the LDPC matrix. Note also that a generator matrix, corresponding to an LDPC matrix, may be employed to encode at least one information bit to generate a plurality of LDPC coded bits and/or an LDPC codeword (e.g., such as using back-substitution described below). A generator matrix, G, of an LDPC code has the following relationship with LDPC matrix, H: $GH^T=0$. An LDPC code may be defined or characterized by its LDPC matrix, H, and/or its generator matrix, G.

A processor of a communication device (e.g., processor 330 of communication device 110) may be configured to encode at least one information bit to generate the plurality of LDPC coded bits and/or an LDPC codeword. The processor then transmits the plurality of LDPC coded bits and/or the LDPC codeword, within an LDPC coded signal via a communication interface (e.g., communication interface 120 of communication device 110). The processor may be configured to generate the LDPC coded signal by appropriate modulation of the plurality of LDPC coded bits and/or the LDPC codeword (e.g., processing within an analog front end including digital to analog conversion, filtering, frequency conversion (up or down), gain adjustment, etc.).

A binary LDPC code may be fully described by its parity check matrix (i.e., its LDPC matrix). At the top of the diagram, the individual elements of an LDPC matrix, H, are shown:

$$H = \begin{bmatrix} h_{0,0} & h_{0,1} & \ldots & h_{0,n-1} \\ h_{1,0} & h_{1,1} & \ldots & h_{1,n-1} \\ \ldots & \ldots & \ldots & \ldots \\ h_{m-1,0} & h_{m-1,1} & \ldots & h_{m-1,n-1} \end{bmatrix}$$

where n is the number of bits in a codeword, m is the number of parity check equations of the LDPC code, and $h_{i,j}$ is either 0 or 1. An n-bit vector c (e.g., $c=(c_1, c_2, \ldots, c_N)$) is a codeword (i.e., of the LDPC code) if and only if $Hc^T=0$.

For such an LDPC code, the parity matrix H is also composed of a number of q-by-q (i.e., q×q) square sub-matrices as shown in the bottom portion of the diagram and also below:

$$H = \begin{bmatrix} S_{0,0} & S_{0,1} & \ldots & S_{0,N-1} \\ S_{1,0} & S_{1,1} & \ldots & S_{1,N-1} \\ \ldots & \ldots & \ldots & \ldots \\ S_{M-1,0} & S_{M-1,1} & \ldots & S_{M-1,N-1} \end{bmatrix}$$

where M=m/q, N=n/q, and each sub-matrix, $S_{I,J}$, thereof is a q-by-q sub-matrix that is either an all-zero-valued sub-matrix (i.e., in which all elements thereof are the value of zero "0", which is depicted by a blank or an empty sub-matrix or a sub-matrix with value of "−1" therein in the associated diagrams) or a CSI (Cyclic Shifted Identity) sub-matrix. A CSI sub-matrix S is characterized by a shift-value, $\lambda(S)$, (e.g., a right shift value) such that the components of S are defined as follows:

$$s_{i,j} = \begin{cases} 1 & \text{if } i+\lambda(S) = j(\text{mod } q) \\ 0 & \text{otherwise} \end{cases}$$

for any i and j, with $0 \leq i < q$ and $0 \leq j < q$. For example, the q-by-q identity matrix is itself a CSI matrix with a shift-value $\lambda(S)=0$ (i.e., a CSI sub-matrix with a cyclic shift of zero "0").

As can be seen, the LDPC matrix (as depicted in the lower portion of the diagram), includes various sub-matrix rows and sub-matrix columns. These sub-matrix rows and columns are based on the sub-matrix construction of the LDPC matrix (e.g., shown as sub-matrix rows 0 through M−1 and sub-matrix columns 0 through N−1). This disclosure presents various new designs of LDPC codes.

Note also the following with respect to such LDPC code matrix constructions. A given LDPC code may be a QC (quasi-cyclic)-LDPC code. The definition of such an (n, k) QC-LDPC code is provided as follows:
1. (n−k)-by-n parity check matrix H
2. H is expanded from a binary base matrix $H_b$ of size v-by-u
3. The base matrix $H_b$ is expanded by replacing each sub-matrix in the base matrix with a size z permutation matrix, and each a blank or "−1" negative with a size z zero matrix. The permutations used are circular right shifts as described above, and the set of permutation sub-matrices contains the size z identity matrix and circular right shifted versions of the identity matrix (i.e., CSI sub-matrices).

Because each permutation matrix is specified by a single circular right shift, the binary base matrix information and permutation replacement information can be combined into a single compact model matrix $H_{bm}$. The model matrix $H_{bm}$ is the same size as the binary base matrix $H_b$, with each binary entry (ij) of the base matrix $H_b$ replaced to create the model matrix $H_{bm}$. Each 0 in $H_b$ is replaced by a blank or "−1" negative to denote a size z all-zero matrix, and each other sub-matrix in $H_b$ is replaced by a circular shift size $p(i,j) \geq 0$ (e.g., an entry of "−1" indicates an all-zero-valued sub-matrix, and any other entry such as 0, 1, 2, etc. indicates an identity sub-matrix (if entry is 0), a CSI sub-matrix based on a shift-value of 1 (if entry is 1), a CSI sub-matrix based on a shift-value of 2 (if entry is 2), etc. and so on for any desired cyclic shift-value). The model matrix $H_{bm}$ can then be directly expanded to the entire LDPC matrix, H.

FIG. 4A is a diagram illustrating an example 401 of an LDPC matrix partitioned into a left hand side matrix and a right hand side matrix. The parity matrix H of the bottom of FIG. 5C may be partitioned into a left hand side matrix, $H_{LHS}$, and a right hand side matrix, $H_{RHS}$. The partitioning will be in between two sub-matrix columns. This diagram shows the partitioning being between sub-matrix column x−1 and sub-matrix column x. Left hand side matrix, $H_{LHS}$, and right hand side matrix, $H_{RHS}$, include the same number of sub-matrix rows. In one implementation, the right hand side matrix, $H_{RHS}$, is a square matrix that includes a same number of sub-matrix rows and sub-matrix columns (e.g., the right hand side matrix, $H_{RHS}$, may generally be of any size such as z-by-z, where z is any desired number such as 2, 3, 4, 5, 6, 7, or even higher numbers etc.).

Figure 4B:
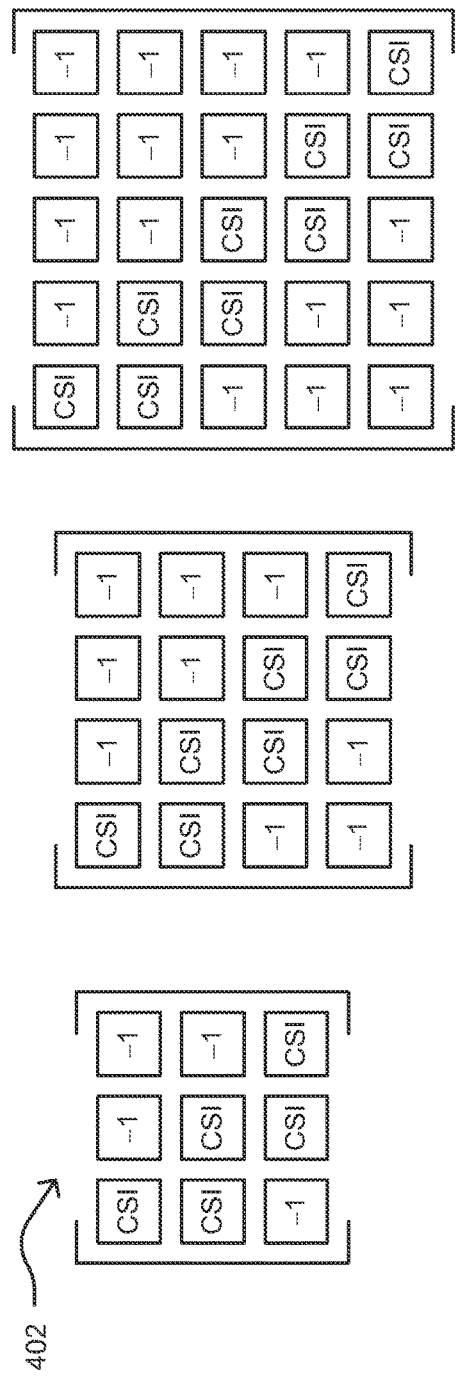
FIG. 4B is a diagram illustrating examples of right hand side matrices of LDPC matrices.

FIG. 4B is a diagram illustrating examples 402 of right hand side matrices of LDPC matrices. A right hand side matrix, $H_{RHS}$, having this form is lower triangular and includes all-zero-valued sub-matrices except for CSI (Cyclic Shifted Identity) sub-matrices located on a main diagonal of the right hand side matrix and another diagonal that is adjacently located to the left of the main diagonal. Note that all of the sub-matrices are all-zero-valued sub-matrices (e.g., all elements of such sub-matrices have value of "0") expect the two adjacent diagonals (e.g., the main diagonal and another diagonal that is adjacently located to the left of the main diagonal). Also, note that these sub-matrices on these two adjacent diagonals may be based on different CSI values. A CSI value of zero indicates an identity sub-matrix. A CSI value of 1 indicates an identity sub-matrix that has undergone a cyclic shift by 1. Any desired CSI value may be employed up to the sub-matrix size, z, if considering sub-matrices of size z-by-z. Generally speaking, a CSI value of x indicates an identity sub-matrix that has undergone a cyclic shift by x.

While examples have been provided showing LDPC decoding, processor 330 can also be configured to perform encoding of bit(s) to generate LDPC coded bit(s) and/or LDPC codeword(s). Such encoding maybe performed using back-substitution. An LDPC matrix may be partitioned into a left hand side matrix, $H_{LHS}$, and a right hand side matrix, $H_{RHS}$, such as shown in FIG. 4A. The right hand side matrix, $H_{RHS}$, can have the form of any of the right hand side matrices of FIG. 4B, and may be of any desired size such as 3-by-3, 4-by-4, 5-by-5, or generally of any size such as z-by-z, where z is any desired number such as 2, 3, 4, 5, 6, 7, etc.

Considering a right hand side matrix, $H_{RHS}$, having the form of those in FIG. 4B, a CSI sub-matrix may be a respective identity matrix that has either not been cyclic shifted (and remains an identity matrix) or a respective identity matrix that has been cyclic shifted by some amount as described above. For sub-matrices of size, L-by-L, input (information) bits, $c_{in}$, (k bits=L(n−m) bits), may be represented as follows: $c_{in}=(c_0, c_1, \ldots, c_{k-1})$ The processor 330 then encodes the input (information) bits and computes L·m parity bits, $c_{par}$ (e.g., LDPC coded bits) as follows: $c_{par}=(c_k, c_{k+1}, \ldots, c_{Ln-1})$ The processor 330 then outputs the following:

$$c_P^T = \begin{pmatrix} C_0 \\ C_1 \\ C_2 \\ C_3 \\ C_4 \end{pmatrix},$$

where $C_i=(c_{L(n-m+i)}, c_{L(n-m+i)+1}, \ldots, c_{L(n-m+i)+L-1})^T$.

For a right hand side matrix, $H_{RHS}$, in the form of those in FIG. 4B being of size 5-by-5 (e.g., where i varies from 0 to 4 in order of 0, 1, 2, 3, 4).

The encoding procedure may be described as follows:
Input: $c_1=(c_0, c_1, \ldots, c_{k-1})$
Step 1: compute $V_i=H_{L,i}c_I^T$, such that $i=0, \ldots, 4$.
Step 2: back-substitution
$C_0=V_0(L-u_{0,0})$
$C_1=V_1(L-u_{1,1})\pm C_0((L-u_{1,1}+u_{1,0}) \bmod L)$
$C_2=V_2(L-u_{2,2})+C_1((L-u_{2,2}+u_{2,1}) \bmod L)$
$C_3=V_3(L-u_{3,3})+C_2((L-u_{3,3}+u_{3,2}) \bmod L)$
$C_4=V_4(L-u_{4,4})\pm C_3((L-u_{4,4}+u_{4,3}) \bmod L)$
Output:

$$c_P^T = \begin{pmatrix} C_0 \\ C_1 \\ C_2 \\ C_3 \\ C_4 \end{pmatrix}$$

FIG. 5A is a diagram illustrating an example 501 of an LDPC matrix of an LDPC code. This LDPC code has the general format as having a right hand side matrix, $H_{RHS}$, in the form of those in FIG. 4B.

The LDPC matrix, H, is partitioned into a left hand side matrix, $H_{LHS}$ (which is shown pictorially as two matrices, $H_{LHS,1}$ and $H_{LHS,2}$, in the diagram because of the large size involved), and a right hand side matrix, $H_{RHS}$.

In some examples, the LDPC code may be shortened for the last 6 information bits in accordance with the operations as described in FIG. 5C to generate a code rate R=0.904 (4050,3660) binary code.

FIG. 5B is a diagram illustrating an example 501 of a communication device configured to perform LDPC encoding and puncturing. A forward error correction (FEC) encoder 520 processes information bits to generate coded bits. In the context of LDPC encoding, encoder 520 employs a generator matrix that is based on a given LDPC code that may also be characterized by a corresponding LDPC matrix. The LDPC matrix can have the characteristics and forms such as described with reference to FIG. 4B such that all sub-matrices of a right hand side (RHS) matrix of the LDPC matrix are all-zero-valued sub-matrices with the exception of those sub-matrices on the main diagonal and the other diagonal adjacently located that are CSI sub-matrices.

A puncturer 530 punctures one or more subsets of information bits and one or more subsets of parity bits from the coded bits generated by the FEC encoder 520 to generate one or more codewords. These subsets of information bits and parity bits may be groups of contiguous bits within the coded bits. For example, a first contiguous subset of information bits (e.g., having a first period) may be punctured, and a contiguous subset of parity bits may be punctured (e.g., having the first or a second period). In other examples, more than one contiguous subset may be punctured from the coded bits (e.g., two or more contiguous subsets of information bits may be punctured, and two or more contiguous subsets of parity bits may be punctured). In even other examples, different numbers of subsets of bits may be punctured from the information bits and the parity bits (e.g., one subset of bits punctured from information bits, and to subsets of bits punctured from the parity bits). Such puncturing may be performed using different periods of bits, and/or different starting locations within the coded bits.

A transmit (TX) driver 590 processes the one or more codewords to generate one or more continuous-time signals for transmission to one or more other devices via one or more communication channels. The TX driver 590 may perform operations such as those of an analog front end (AFE) of a communication device (e.g., digital to analog conversion, frequency conversion such as conversion, scaling, filtering, etc.). Generally, the TX driver 590 operates to generate a signal suitable for transmission from the communication device. In other examples, all of the operations shown in FIG. 5B may be performed by processor 130a.

FIG. 5C is a diagram illustrating an example 502 of a communication device configured to perform bit filling, LDPC encoding, shortening, and puncturing. The example 502 has some similarity to the example 501 of FIG. 5B with differences being that a bit filler 505 operates to add one or more zero-valued bits to the incoming information bits before encoding by the FEC encoder 520. After FEC encoding, a shortener 525 operates to remove those zero-valued bits that were added to the information bit before undergoing FEC encoding. The other components (520, 530, and 590) in the example 502 generally operate similarly as within example 501 of FIG. 5B.

Note that the operations of the various functional blocks, components, etc. within FIGS. 5B and 5C may be performed within communication device 110. For example, communication interface 120 of device 110 may be configured to perform the operations of the transmit (TX) driver 590. The processor 330 of device 110 may be configured to perform bit filling, LDPC encoding, shortening, puncturing, and/or other related operations. In other examples, all of the operations shown in FIG. 5C may be performed by processor 130a.

Figure 6A:
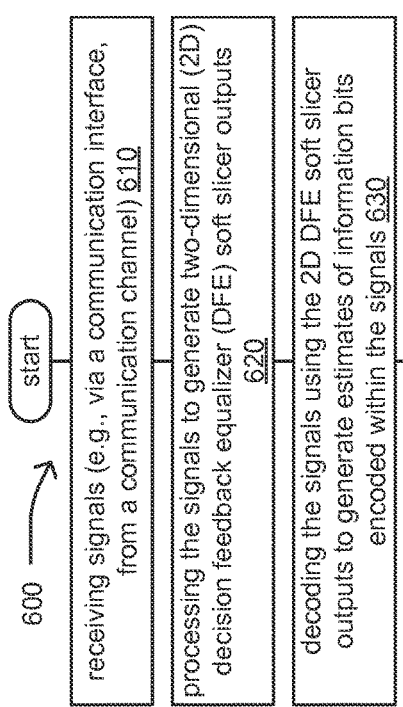
FIG. 6A is a diagram illustrating an embodiment of a method for execution by one or more communication devices.

FIG. 6A is a diagram illustrating an embodiment of a method 600 for execution by one or more wireless communication devices. The method 600 begins by receiving signals (block 610). For example, this may involve receiving the signals from a communication channel via a communication interface of a communication device. The method 600 continues by processing the signals to generate two-dimensional (2D) decision feedback equalizer (DFE) soft slicer outputs (block 620). The method 600 then operates by decoding the signals based on the 2D DFE soft slicer outputs to generate estimates of information encoded within the signals (block 630).

Figure 6B:
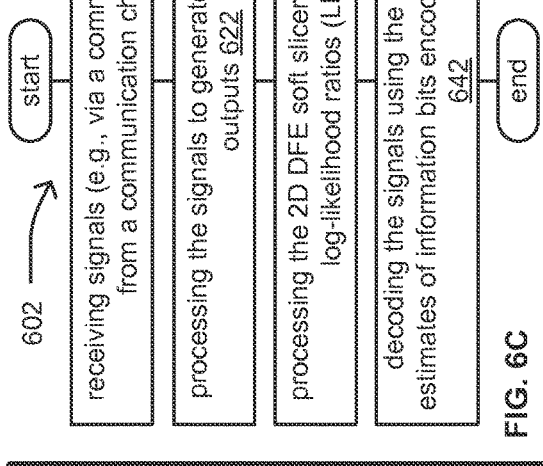
FIG. 6B is a diagram illustrating an embodiment of a method for execution by one or more communication devices.

FIG. 6B is a diagram illustrating an embodiment of a method 601 for execution by one or more communication devices. The method 601 begins by receiving signals (block 611). For example, this may involve receiving the signals from a communication channel via a communication interface of a communication device. The method 601 continues by processing the signals to generate 2D DFE soft slicer output (block 621).

The method 601 continues by processing the 2D DFE soft slicer output to generate 2D DFE hard decisions (block 631). The method 601 then operates by generating estimates of information encoded within the signals based on the 2D DFE hard decisions (block 641).

Figure 6C:
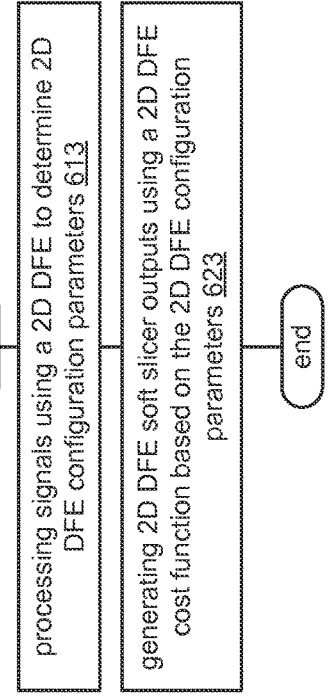
FIG. 6C is a diagram illustrating an embodiment of a method for execution by one or more communication devices.

FIG. 6C is a diagram illustrating an embodiment of a method 602 for execution by one or more communication devices. The method 602 begins by receiving signals (block 612). For example, this may involve receiving the signals from a communication channel via a communication interface of a communication device. The method 602 continues by processing the signals to generate 2D DFE soft slicer outputs (block 622).

The method 602 continues by process the 2D DFE soft slicer outputs to generate log-likelihood ratios (LLRs) (block 632). The method 602 continues by decoding the signals using the LLRs to generate the estimates of information encoded within the signals (block 642).

In some examples, the method 602 operates by processing the 2D DFE soft slicer outputs to generate symbol metrics based on a 2D constellation of the signals that includes constellation points arranged respectively in predetermined locations. The method 602 then processes the symbol metrics to generate the LLRs and then decodes the signals using the LLRs based on an low density parity check (LDPC) code to generate the estimates of information encoded within the signals.

Figure 6D:
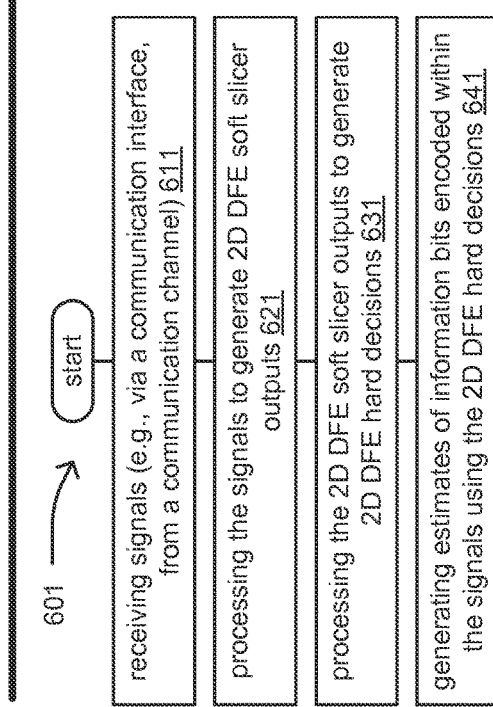
FIG. 6D is a diagram illustrating another embodiment of a method for execution by one or more communication devices.

FIG. 6D is a diagram illustrating another embodiment of a method 603 for execution by one or more communication devices. The method 603 begins by processing signals using a 2D DFE to determine 2D DFE configuration parameters (block 613). The method 603 continues by generating DFE soft slicer outputs using a 2D DFE function based on a cost function that is based on noise and/or interference associated with a communication channel (623). In some example, this may involve generating the 2D DFE soft slicer outputs using a 2D DFE function based on the 2D DFE configuration parameters, a 2D constellation of the signals that includes a constellation points arranged respectively in predetermined locations, and a cost function that is based on noise and/or interference associated with the communication channel.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
a processor configured to:
receive a plurality of signals from a communication channel;
process the plurality of signals including processing two successive signals of the plurality of signals together as inputs of a two-dimensional (2D) decision feedback equalizer (DFE) to generate a plurality of 2D DFE soft slicer outputs including generating two successive 2D DFE soft slicer outputs signals together; and
decode the plurality of signals based on the plurality of 2D DFE soft slicer outputs to generate estimates of information encoded within the plurality of signals.

2. The communication device of claim 1, wherein the processor is further configured to:
generate the plurality of 2D DFE soft slicer outputs using a 2D DFE function based on a plurality of 2D DFE configuration, parameters that includes at least one of a start-up value or a default value for at least one of a register value associated with a delay element of a tapped delay line of the 2D DFE or an adjustable gain associated with a tap of the tapped delay line of the 2D DFE during at least one iteration, a 2D constellation of the plurality of signals that includes a plurality of constellation points arranged respectively in predetermined locations, and a cost function that is based on at least one of noise or interference associated with the communication channel.

3. The communication device of claim 1, wherein the processor is further configured to:
generate a first 2D DFE soft slicer output of the plurality of 2D DFE soft slicer outputs that is associated with a first dimension of a 2D constellation based on a first signal of the plurality of signals and a 2D DFE function as calculated based on a plurality of 2D DFE configuration, parameters that includes at least one of a start-up value or a default value for at least one of a register value associated with a delay element of a tapped delay line of the 2D DFE or an adjustable gain associated with a tap of the tapped delay line of the 2D DFE during at least one iteration, wherein the 2D constellation includes a plurality of constellation points arranged respectively in predetermined locations;
generate intermediate soft information using a cost function that is based on at least one of additive white Gaussian noise (AWGN) or narrowband interference (NBI) associated with the communication channel; and
generate a second 2D DFE soft slicer output of the plurality of 2D DFE soft slicer outputs that is associated with a second dimension of the 2D constellation based on a second signal of the plurality of signals and the 2D DFE function as calculated based on the intermediate soft information and at least some of the plurality of 2D DFE configuration parameters.

4. The communication device of claim 1, wherein the processor is further configured to:
process the plurality of 2D DFE soft slicer outputs to generate a plurality of log-likelihood ratios (LLRs); and
decode the plurality of signals using the plurality of LLRs to generate the estimates of the information encoded within the plurality of signals.

5. The communication device of claim 1, wherein the processor is further configured to:
process the plurality of 2D DFE soft slicer outputs to generate a plurality of symbol metrics based on a 2D constellation of the plurality of signals that includes a plurality of constellation points arranged respectively in predetermined locations;
process the plurality of symbol metrics to generate a plurality of log-likelihood ratios (LLRs); and
decode the plurality of signals using the plurality of LLRs based on an low density parity check (LDPC) code to generate the estimates of the information encoded within the plurality of signals.

6. The communication device of claim 5, wherein the processor is further configured to:
decode the plurality of signals using an LDPC matrix associated with the LDPC code to generate the estimates of the information encoded within the plurality of signals, wherein the LDPC matrix includes a plurality of sub-matrices arranged in a left hand side matrix and a right hand side matrix, wherein the right hand side matrix is lower triangular and includes all-zero-valued sub-matrices except for CSI (Cyclic Shifted Identity) sub-matrices located on a main diagonal of the right hand side matrix and another diagonal that is adjacently located to a left of the main diagonal.

7. The communication device of claim 1, wherein the processor is further configured to:
process the plurality of 2D DFE soft slicer outputs to generate a plurality of 2D DFE hard decisions; and
generate other estimates of the information encoded within the plurality of signals based on the plurality of 2D DFE hard decisions.

8. The communication device of claim 1, wherein the processor is further configured to:
support communications within at least one of a satellite communication system, a wireless communication system, a wired communication system, a fiber-optic communication system, or a mobile communication system.

9. A communication device comprising:
a processor configured to:
receive a plurality of signals from a communication channel;
generate a first plurality of two-dimensional (2D) decision feedback equalizer (DFE) soft slicer outputs associated with a first dimension of a 2D constellation based on a first signal of the plurality of signals and a 2D DFE function as calculated based on a plurality of 2D DFE configuration parameters that includes at least one of a start-up value or a default value for at least one of a register value associated with a delay element of a tapped delay line of the 2D DFE or an adjustable gain associated with a tap of the tapped delay line of the 2D DFE during at least one iteration, wherein the 2D constellation includes a plurality of constellation points arranged respectively in predetermined locations;
generate intermediate soft information using a cost function that is based on at least one of additive white Gaussian noise (AWGN) or narrowband interference (NBI) associated with the communication channel;

generate a second plurality of 2D DFE soft slicer outputs associated with a second dimension of the 2D constellation based on a second signal of the plurality of signals and the 2D DFE function as calculated based on the intermediate soft information and at least some of the plurality of 2D DFE configuration parameters;

process the first plurality of 2D DFE soft slicer outputs and the second plurality of 2D DFE soft slicer outputs to generate a third plurality of 2D DFE soft slicer outputs associated with both the first dimension and the second dimension of the 2D constellation;

process the third plurality of 2D DFE soft slicer outputs to generate a plurality of log-likelihood ratios (LLRs); and decode the plurality of signals using the plurality of LLRs to generate estimates of the information encoded within the plurality of signals.

10. The communication device of claim 9, wherein the processor is further configured to:

process the third plurality of 2D DFE soft slicer outputs to generate a plurality of symbol metrics based on the 2D constellation that includes the plurality of constellation points arranged respectively in the predetermined locations;

process the plurality of symbol metrics to generate a plurality of log-likelihood ratios (LLRs); and decode the plurality of signals using the plurality of LLRs based on an low density parity check (LDPC) code to generate the estimates of the information encoded within the plurality of signals.

11. The communication device of claim 10, wherein the processor is further configured to:

decode the plurality of signals using an LDPC matrix associated with the LDPC code to generate the estimates of the information encoded within the plurality of signals, wherein the LDPC matrix includes a plurality of sub-matrices arranged in a left hand side matrix and a right hand side matrix, wherein the right hand side matrix is lower triangular and includes all-zero-valued sub-matrices except for CSI (Cyclic Shifted Identity) sub-matrices located on a main diagonal of the right hand side matrix and another diagonal that is adjacently located to a left of the main diagonal.

12. The communication device of claim 9, wherein the processor is further configured to:

process the plurality of 2D DFE soft slicer outputs to generate a plurality of 2D DFE hard decisions; and generate other estimates of the information encoded within the plurality of signals based on the plurality of 2D DFE hard decisions.

13. The communication device of claim 9, wherein the processor is further configured to:

support communications within at least one of a satellite communication system, a wireless communication system, a wired communication system, a fiber-optic communication system, or a mobile communication system.

14. A method for execution by a communication device, the method comprising:

receiving, via a communication interface of the communication device, a plurality of signals from a communication channel;

processing the plurality of signals including processing two successive signals of the plurality of signals together as inputs of a two-dimensional (2D) decision feedback equalizer (DFE) to generate a plurality of 2D DFE soft slicer outputs including generating two successive 2D DFE soft slicer outputs signals together; and decoding the plurality of signals based on the plurality of 2D DFE soft slicer outputs to generate estimates of information encoded within the plurality of signals.

15. The method of claim 14 further comprising:

generating the plurality of 2D DFE soft slicer outputs using a 2D DFE function based on a plurality of 2D DFE configuration parameters that includes at least one of a start-up value or a default value for at least one of a register value associated with a delay element of a tapped delay line of the 2D DFE or an adjustable gain associated with a tap of the tapped delay line of the 2D DFE during at least one iteration, a 2D constellation of the plurality of signals that includes a plurality of constellation points arranged respectively in predetermined locations, and a cost function that is based on at least one of noise or interference associated with the communication channel.

16. The method of claim 14 further comprising:

generating a first 2D DFE soft slicer output of the plurality of 2D DFE soft slicer outputs that is associated with a first dimension of a 2D constellation based on a first signal of the plurality of signals and a 2D DFE function as calculated based on a plurality of 2D DFE configuration parameters that includes at least one of a start-up value or a default value for at least one of a register value associated with a delay element of a tapped delay line of the 2D DFE or an adjustable gain associated with a tap of the tapped delay line of the 2D DFE during at least one iteration, wherein the 2D constellation includes a plurality of constellation points arranged respectively in predetermined locations;

generating intermediate soft information using a cost function that is based on at least one of additive white Gaussian noise (AWGN) or narrowband interference (NBI) associated with the communication channel; and generating a second 2D DFE soft slicer output of the plurality of 2D DFE soft slicer outputs that is associated with a second dimension of the 2D constellation based on a second signal of the plurality of signals and the 2D DFE function as calculated based on the intermediate soft information and at least some of the plurality of 2D DFE configuration parameters.

17. The method of claim 14 further comprising:

processing the plurality of 2D DFE soft slicer outputs to generate a plurality of log-likelihood ratios (LLRs); and decoding the plurality of signals using the plurality of LLRs to generate the estimates of the information encoded within the plurality of signals.

18. The method of claim 14 further comprising:

processing the plurality of 2D DFE soft slicer outputs to generate a plurality of symbol metrics based on a 2D constellation of the plurality of signals that includes a plurality of constellation points arranged respectively in predetermined locations;

processing the plurality of symbol metrics to generate a plurality of log-likelihood ratios (LLRs); and decoding the plurality of signals using the plurality of LLRs based on an low density parity check (LDPC) code characterized by an LDPC matrix to generate the estimates of the information encoded within the plurality of signals, wherein the LDPC matrix includes a plurality of sub-matrices arranged in a left hand side matrix and a right hand side matrix, wherein the right hand side matrix is lower triangular and includes allzero-valued sub-matrices except for CSI (Cyclic Shifted Identity) sub-matrices located on a main diagonal of the right hand side matrix and another diagonal that is adjacently located to a left of the main diagonal.

19. The method of claim 14 further comprising:
processing the plurality of 2D DFE soft slicer outputs to generate a plurality of 2D DFE hard decisions; and
generating other estimates of the information encoded within the plurality of signals based on the plurality of 2D DFE hard decisions.

20. The method of claim 14 further comprising:
operating the communication interface of the communication device to support communications within at least one of a satellite communication system, a wireless communication system, a wired communication system, a fiber-optic communication system, or a mobile communication system.

* * * * *